United States Patent
Da Silva et al.

(10) Patent No.: US 11,400,935 B2
(45) Date of Patent: Aug. 2, 2022

(54) METHOD FOR A MOTOR VEHICLE TO SELECT A PREFERRED TRAFFIC LANE TO CROSS A TOLL AREA

(71) Applicants: Renault s.a.s., Boulogne-Billancourt (FR); NISSAN MOTOR CO., LTD., Yokohama (JP)

(72) Inventors: Jorge Da Silva, Saint Denis (FR); Guillermo Pita-Gil, Versailles (FR); Chrysanthi Papamichail, Maisons Laffitte (FR)

(73) Assignees: Renault s.a.s., Boulogne-Billancourt (FR); NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 17/048,885

(22) PCT Filed: Apr. 23, 2019

(86) PCT No.: PCT/EP2019/060290
§ 371 (c)(1),
(2) Date: Oct. 19, 2020

(87) PCT Pub. No.: WO2019/206860
PCT Pub. Date: Oct. 31, 2019

(65) Prior Publication Data
US 2021/0122374 A1    Apr. 29, 2021

(30) Foreign Application Priority Data
Apr. 23, 2018  (FR) .................................. 18 53539

(51) Int. Cl.
*B60W 30/18*   (2012.01)
*B60W 30/095*  (2012.01)
(Continued)

(52) U.S. Cl.
CPC .. *B60W 30/18163* (2013.01); *B60W 30/0956* (2013.01); *G01C 21/3461* (2013.01);
(Continued)

(58) Field of Classification Search
CPC ....... B60W 30/18163; B60W 30/0956; B60W 2554/80; B60W 2554/00; B60W 40/06;
(Continued)

(56) References Cited

U.S. PATENT DOCUMENTS 10,162,355 B2 * 12/2018 Hayon ............... G01C 21/3602
11,125,570 B2 *  9/2021 Prabhudeva ....... G01C 21/3658
(Continued)

FOREIGN PATENT DOCUMENTS

CN    112224211 A  *  1/2021
CN    111402613 B  *  9/2021  ....... G08G 1/096708
(Continued)

OTHER PUBLICATIONS

International Search Report dated Aug. 12, 2019 in PCT/EP2019/060290 filed on Apr. 23, 2019, 2 pages.

*Primary Examiner* — Angelina Shudy
(74) *Attorney, Agent, or Firm* — Oblon, McClelland, Maier & Neustadt, L.L.P.

(57) ABSTRACT

A method for a motor vehicle to select a preferred traffic lane to access a toll area having a plurality of traffic lanes includes the following: a) detecting traffic lanes of the toll area, b) determining, for at least some of the traffic lanes, a first item of data relating to the distance between the motor vehicle and the corresponding traffic lane, and a second item of data relating to the number of other vehicles situated on the corresponding traffic lane, c) minimizing a cost function that depends on each first item of data and on each second item of data, so as to identify the preferred traffic lane, and d) determining the possibility or the risk for the motor
(Continued)

vehicle of changing traffic lane in order to move towards the preferred traffic lane.

8 Claims, 3 Drawing Sheets

(51) Int. Cl.
    *G01C 21/34*     (2006.01)
    *G01C 21/36*     (2006.01)
    *G06V 20/56*     (2022.01)

(52) U.S. Cl.
    CPC ....... *G01C 21/3658* (2013.01); *G06V 20/588* (2022.01); *B60W 2554/80* (2020.02)

(58) Field of Classification Search
    CPC ......... B60W 40/10; B60W 2050/0002; B60W 2520/10; G01C 21/3461; G01C 21/3658; G06K 9/00798; B62D 15/0255; G08G 1/167; G06V 20/588; B60Y 2300/0954; B60Y 2300/18166; B60Y 2400/301
    See application file for complete search history.

(56) References Cited

U.S. PATENT DOCUMENTS

| | | | |
|---|---|---|---|
| 11,173,906 B2 * | 11/2021 | Mizutani | B60W 30/165 |
| 2014/0278052 A1 * | 9/2014 | Slavin | G08G 1/0129 |
| | | | 701/400 |
| 2017/0120908 A1 * | 5/2017 | Oniwa | B60W 30/10 |
| 2017/0232967 A1 * | 8/2017 | Tomatsu | B60W 30/0956 |
| | | | 701/117 |
| 2017/0259819 A1 * | 9/2017 | Takeda | B60W 10/04 |
| 2017/0336788 A1 * | 11/2017 | Iagnemma | G05D 1/0246 |
| 2017/0349183 A1 * | 12/2017 | Sen | B60W 50/085 |
| 2017/0364083 A1 * | 12/2017 | Yang | G08G 1/167 |
| 2018/0113450 A1 * | 4/2018 | Sherony | G01C 21/3691 |
| 2018/0173231 A1 * | 6/2018 | Takae | B60W 30/12 |
| 2018/0174371 A1 * | 6/2018 | Um | G06K 9/00798 |
| 2018/0194354 A1 * | 7/2018 | Takeda | B60W 60/001 |
| 2018/0253975 A1 * | 9/2018 | Mizutani | B60W 30/16 |
| 2019/0164357 A1 * | 5/2019 | John | G01C 21/3658 |
| 2019/0171206 A1 * | 6/2019 | Abrams | G01C 21/3658 |
| 2019/0329782 A1 * | 10/2019 | Shalev-Shwartz | |
| | | | B60W 30/0956 |
| 2019/0382019 A1 * | 12/2019 | Abe | G08G 1/167 |
| 2019/0389463 A1 * | 12/2019 | Mizutani | B60W 30/165 |
| 2020/0198633 A1 * | 6/2020 | Fujimaki | B60W 30/10 |
| 2020/0217685 A1 * | 7/2020 | Koh | G06K 9/00798 |
| 2020/0234582 A1 * | 7/2020 | Mintz | G08G 1/0145 |
| 2020/0269840 A1 * | 8/2020 | Tsuji | B60W 50/087 |
| 2021/0269039 A1 * | 9/2021 | Kagerer | B60W 40/072 |
| 2021/0370978 A1 * | 12/2021 | Molinari | B60W 30/18163 |

FOREIGN PATENT DOCUMENTS

| | | | |
|---|---|---|---|
| DE | 102020117160 B3 * | 10/2021 | |
| EP | 3 246 892 A1 | 11/2017 | |
| JP | 3539416 B2 * | 7/2004 | |
| JP | 3846135 B2 * | 11/2006 | |

\* cited by examiner

METHOD FOR A MOTOR VEHICLE TO SELECT A PREFERRED TRAFFIC LANE TO CROSS A TOLL AREA

TECHNICAL FIELD TO WHICH THE INVENTION RELATES

The present invention generally relates to the field of driver assistance and of autonomous vehicles.

It more particularly relates to a method for selecting with a motor vehicle a preferred lane in which to approach a toll-collection area comprising a plurality of lanes.

It also relates to a method for controlling an autonomous motor vehicle so that it drives towards this preferred lane.

TECHNOLOGICAL BACKGROUND

A decision-assisting method allowing which lane to be used when a vehicle reaches a toll-collection area to be decided upon is known from document DE102012022629.

In this document, the vehicle is equipped with wireless communication means suitable for receiving data sent by the toll-collection area. These data are relative to open and closed lanes, to payment means accepted in each lane, and to the number of third-party vehicles waiting in each lane (the latter information being available if the third-party vehicles are themselves equipped with communication means).

The major drawback of this method is that it requires a wireless communication to be set up between the motor vehicle and the toll-collection area, this in practice never being guaranteed. It furthermore requires motor vehicles and toll-collection areas to be equipped with expensive communication means.

SUBJECT OF THE INVENTION

In order to remedy the aforementioned drawbacks of the prior art, the present invention provides a method in which the vehicle very reliably and safely determines which lane it must preferably use to pass through the toll-collection area, without having to communicate with this toll-collection area.

More particularly, according to the invention a method for selecting with a motor vehicle a preferred lane for accessing a toll-collection area is provided, comprising steps:

a) of detecting lanes of the toll-collection area, b) of determining, for one portion at least of said lanes, a first datum relative to the distance separating the motor vehicle from the corresponding lane, and a second datum relative to the number of third-party vehicles located in the corresponding lane, c) of computing the value of a cost function for each of the lanes of said portion, depending on the corresponding first datum and the corresponding second datum, and identifying the preferred lane as being the lane for which the value of the cost function is the lowest of the computed values, and d) of determining whether it is possible for the motor vehicle to change lane to move to the preferred lane or the risk that it would run doing so.

Thus, by virtue of the invention, the choice of the lane to be used to approach the toll-collection area depends not only on the number of vehicles in each lane, but also on the distance separating the vehicle from each lane and on the potential danger that will be met reaching the preferred lane. It therefore allows the motor vehicle to be driven safely.

Preferably, this method merely uses solely the equipment of the motor vehicle. It is therefore reliable whether the toll-collection area is equipped with communication means or not.

The following are other nonlimiting and advantageous features of the method according to the invention:

the motor vehicle being equipped with at least one range-finding sensor, in step b), the second datum is an estimation of the number of third-party vehicles located in each of said lanes, which is determined depending on the measurements carried out by said range-finding sensor;

in step c), the value of the cost function is computed for each of the lanes of said portion, depending on the sum of the corresponding first datum, weighted by a first coefficient, and of the corresponding second datum, weighted by a second coefficient;

being given a lane that neighbors the lane being used by the motor vehicle and that is located on the side of the preferred lane with respect to the lane being used by the motor vehicle, in step d), it is checked whether the maneuver time required for the motor vehicle to change lane to reach a desired location in said neighboring lane is strictly shorter than the arrival time required by the third-party vehicles being driven in said neighboring lane to arrive at the desired location;

in step d), a two-fold criterion relative to the relative speed of the motor vehicle with respect to the two third-party vehicles that are being driven in front and behind the motor vehicle, in the neighboring lane, is checked;

as a variant or in addition, in step d) a criterion relative to the maneuver time required for the motor vehicle to change lane is checked;

the motor vehicle being equipped with an image-acquiring means and a computing unit, in step a), the image-acquiring means acquires an image of the toll-collection area and the computing unit processes said image in order to detect the open lanes of the toll-collection area, and, in step b), the computing unit determines the first datum and the second datum for each open lane;

the motor vehicle being equipped with an image-acquiring means and a computing unit, in step a), the image-acquiring means acquires an image of the toll-collection area, and, in step b), the computing unit processes said image in order to evaluate the first datum;

the motor vehicle being equipped with a geo-locating means, a memory storing a roadmap and a computing unit, in step b), the computing unit computes the first datum depending on the geo-located position of the motor vehicle, which position is obtained by the geo-locating means, and on the geometry of the toll-collection area, which is stored in the memory.

The invention also relates to a method for controlling an autonomous motor vehicle, comprising:

steps a) to d) of the selecting method defined above, then a step of controlling the motor vehicle in question towards the desired lane.

Preferably, if the desired lane does not neighbor the lane being used by the motor vehicle, provision is made, after the vehicle has changed lane a first time, to repeat said steps a) to d).

BRIEF DESCRIPTION OF THE DRAWINGS

The following description, which is given with reference to the appended drawings, which are given by way of nonlimiting example, will allow of what the invention consists and how it may be implemented to be clearly understood.

In the appended drawings.

To start with it will be noted that elements that are identical or similar and that appear in the various figures have been, as far as possible, referenced with the same reference signs and will not be described each time.

DETAILED DESCRIPTION

Figure 1:
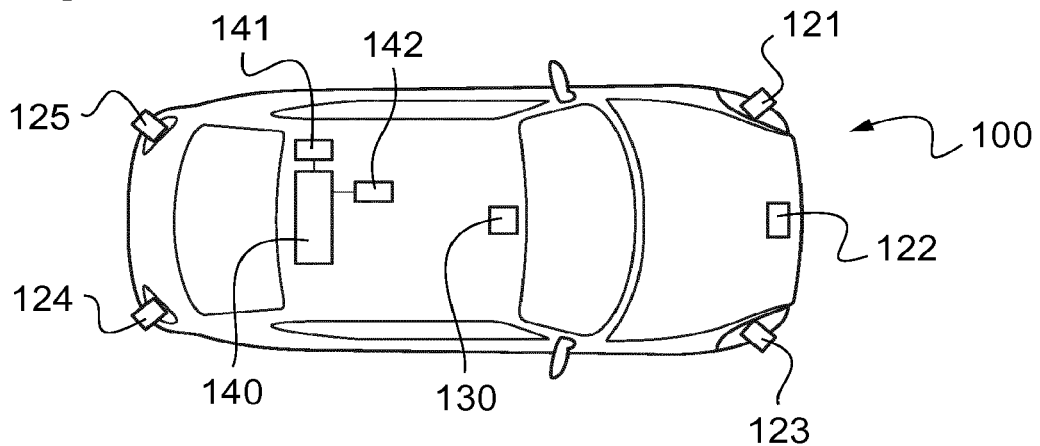
FIG. 1 is a schematic view of a motor vehicle suitable for implementing a selecting method according to the invention.

FIG. 1 shows a motor vehicle 100 seen from above.

As may be seen in this figure, the motor vehicle 100 is here a conventional automobile, comprising a chassis that is supported by wheels and that itself supports various pieces of equipment that include a drivetrain, braking means, and a steering unit.

It will possibly be a question of a manually controlled vehicle, in which case the latter will be equipped with means for displaying destination information to the driver, or preferably, of an autonomous vehicle. It is moreover the case of an autonomous vehicle that will be considered here in the rest of this description.

This motor vehicle 100 is equipped with sensors that allow it to determine its location in its environment so as to be able to drive itself autonomously, i.e. without human intervention.

Any type of sensor could be employed.

In the example shown in FIG. 1, the motor vehicle 100 is equipped with a camera 130 that is oriented toward in front of the vehicle in order to capture images of the environment located in front of the vehicle.

The motor vehicle 100 is furthermore equipped with at least one (radar, lidar or sonar) range-finding sensor. It is more precisely here equipped with five radar sensors 121, 122, 123, 124, 125 at the four corners of the vehicle and in a central position at the front of the vehicle.

The motor vehicle 100 is also equipped with a geo-locating system 141, for example comprising a GNSS receiver (typically a GPS sensor).

In order to process the information delivered by these various components and to be able to generate control settings for the drivetrain, the braking means, and the steering unit, the motor vehicle 100 is equipped with a computer 140.

This computer 140 comprises a processor (CPU), a random-access memory (RAM), a read-only memory (ROM), analogue-digital converters, and various input and/or output interfaces.

By virtue of its input interfaces, the computer 140 is able to receive input signals from the various sensors.

The computer 140 is moreover connected to a memory 142 that stores a roadmap. It will here be considered that it is a question of a detailed map, in which the geometries of toll-collection areas are given.

The read-only memory of the computer 140 for its part stores application software, consisting of computer programs containing instructions the execution of which by the processor allows the computer to implement the method described below.

Lastly, by virtue of its output interfaces, the controller is able to transmit settings to the various units of the vehicle.

Figure 3:
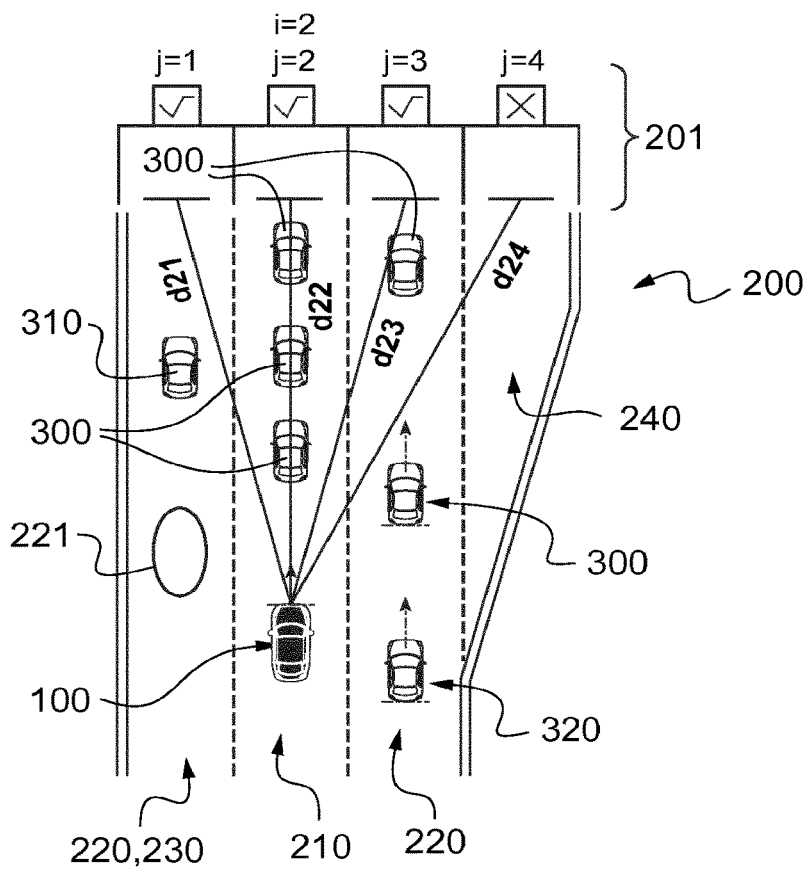
FIGS. 3 to 6 are schematic views from above of toll-collection areas, in which various vehicles including the motor vehicle of FIG. 1 are shown.
Figure 4:
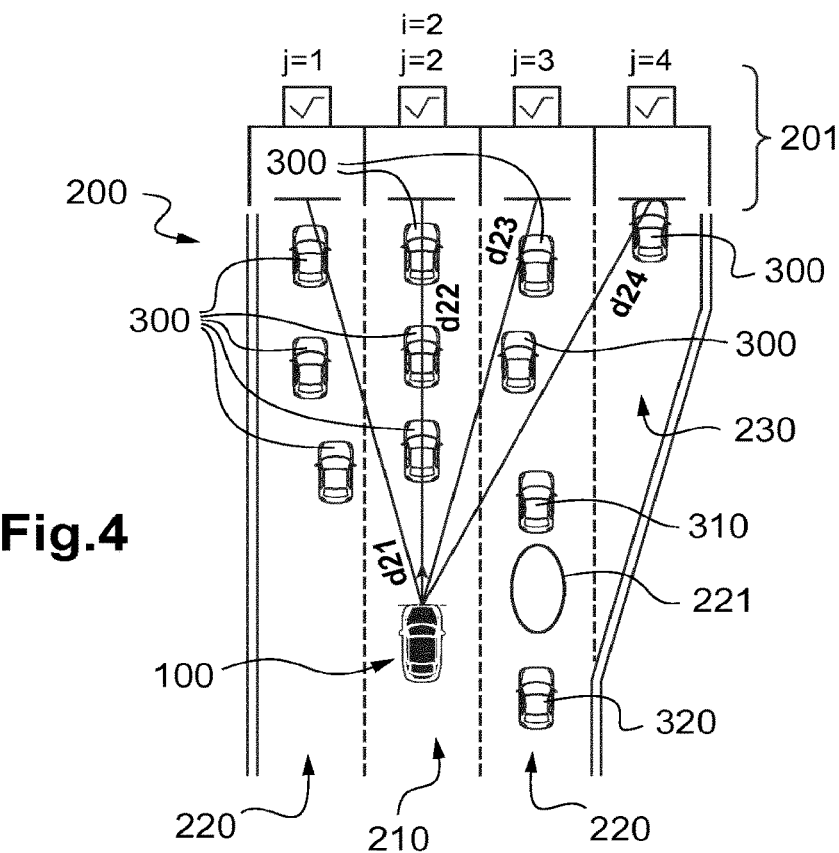

In FIGS. 3 and 4 on one hand, and 5 and 6 on the other hand, two toll-collection areas 200 seen from above are shown.

These toll-collection areas 200 each comprise a toll plaza 201 at which the user of each vehicle must pay a toll. Each toll-collection area 200 also comprises, to access this toll plaza 201, a number N of lanes 210, 220, 230, 240 (with N equal to 4 in FIGS. 3 and 4, and N equal to 8 in the FIGS. 5 a 6).

The toll plaza 201 comprises, above each lane, an LED panel on which a logo is shown. This logo may for example represent a red cross if the lane is closed to traffic, or a green arrow if the lane is open. It could also represent other things (a blue card if payment by bank card is possible, an orange "t" if remote payment is possible, etc.).

In the rest of this description, among the lanes, the following will be distinguished between:

the current lane 210, which is the lane being used by the motor vehicle 100 in question;

neighboring lanes 220, which are the two lanes located on either side of the current lane 210; and the preferred lane 230, which is the lane that, as will become clearer in the rest of this description, is judged to be the one that is most suitable for allowing rapid passage in complete safety through the toll plaza 201.

Lanes designated by the reference "240" are lanes that meet none of the three aforementioned criteria.

As FIGS. 3 to 6 show, motor vehicles other than the aforementioned motor vehicle 100, which motor vehicles are referred to as third-party vehicles 300, 310, 320 below, are also considered here to be being driven in the lanes of the toll-collection area.

Among these third-party vehicles, the following are distinguished between:

the preceding vehicle 310, which is the third-party vehicle that is being driven in one of the two neighboring lanes 220, namely the lane into which the motor vehicle 100 desires to pull out, and that is located in front of the motor vehicle 100, and the following vehicle 320, which is the third-party vehicle that is being driven in the same neighboring Lane 220 and that is located behind the motor vehicle 100.

When the motor vehicle 100, which is here considered to be autonomous, approaches a toll-collection area 200, it must choose one of the lanes 210, 220, 230, 240. In other words, the computer 140 must judge the opportuneness of changing lane on its arrival in a toll-collection area, in order to pass as rapidly as possible and in complete safety the toll plaza 201.

To do this, its computer 140 implements a method comprising a plurality of main steps.

A prior first step consists in the computer 140 verifying that the data measured by the various pieces of equipment of the motor vehicle 100 (radar sensors and cameras) are exploitable.

Specifically, it is possible, especially depending on the weather, for this not to be the case.

To do this, the computer 140 receives from each of its pieces of equipment a confidence index (here expressed in the form of a percentage of confidence in the reliability of its measurement) that it compares to a preset threshold.

Figure 2:
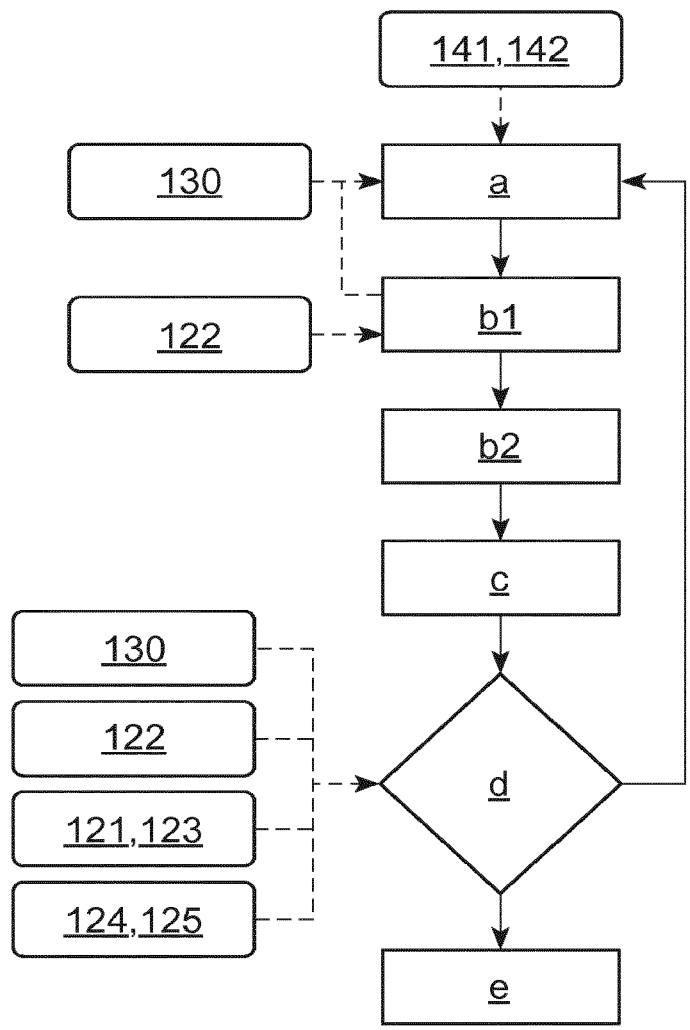
FIG. 2 shows in the form of a flowchart an example of a selecting method according to invention.

If the confidence index is not high enough, the process is interrupted. In the contrary case, the method illustrated in FIG. 2 is implemented.

The first step a) of this method consists in determining the geography of the sites.

To do this, the computer 140 uses either the camera 130 alone, or the geo-locating means 141 coupled with the memory 142, or all of these elements in combination.

More precisely here, it acquires an image captured by the camera 130, and the geo-located position of the motor vehicle 100.

Taking into account this geo-located position, the motor vehicle 100 is able to find, in the memory 142, a plan of the toll-collection area 200.

It is thus able to determine the number N of lanes of the motorway area 200.

The computer 140 then assigns, to each lane, an identifier denoted "j" below. This identifier is here a natural integer comprised between 1 and N, the lane identified by the integer j=1 being the leftmost lane.

Next, via a process for processing the acquired image, the computer 140 identifies the logos located above each of the lanes. It then identifies the shape and color of each logo and thus determines which lanes are open.

In the configuration illustrated in FIG. 3, the lane identified by the integer j=4 is closed whereas the other lanes are open.

In the configuration illustrated in FIG. 4, all the lanes are open.

Figure 5:
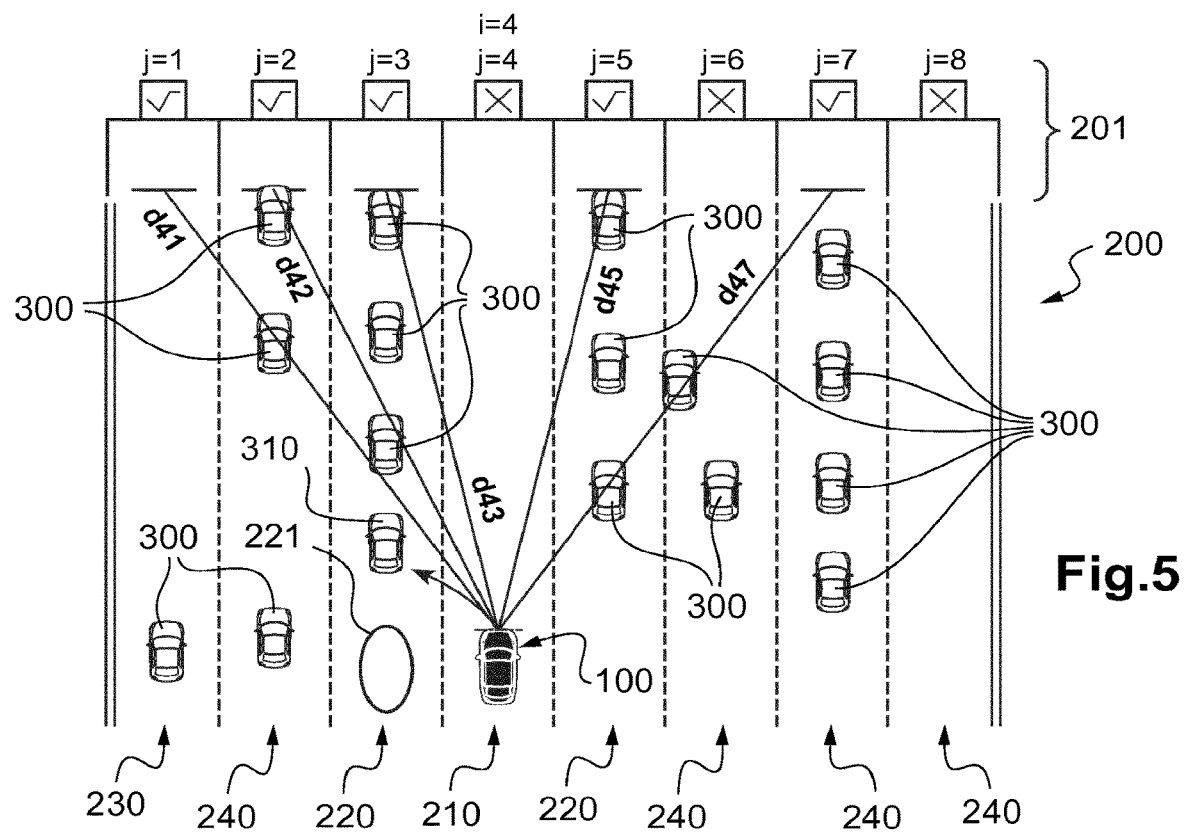
Figure 6:
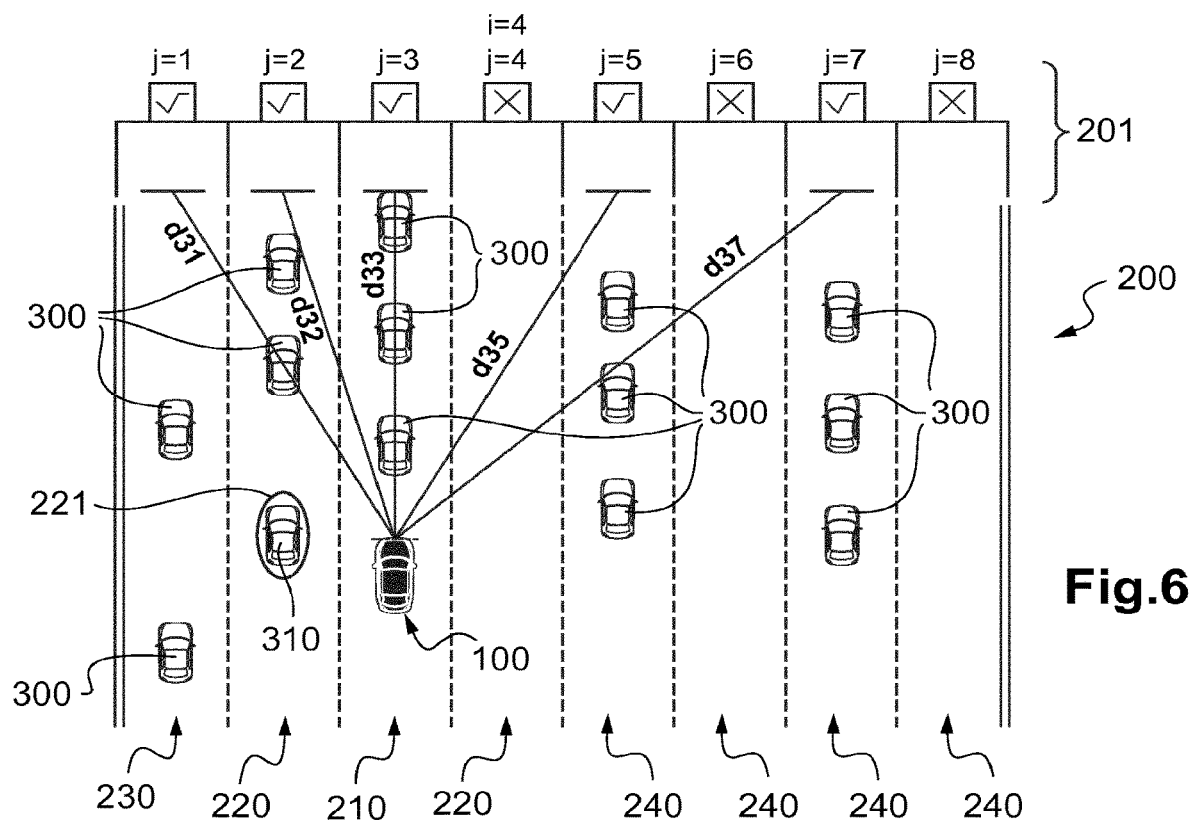

In the configuration illustrated in FIGS. 5 and 6, the lanes identified by the integers j=4, j=6 and j=8 are closed whereas the other lanes are open.

In a second step b1), the computer determines to what extent the motor vehicle 100 is far from each open lane.

To this end it computes, for each open lane, a first datum relative to the distance separating the motor vehicle 100 from this lane.

This first datum is here an estimation of the Euclidean distance $d_{ij}$ separating the motor vehicle 100 and the point located at the center of the lane in question, level with the toll plaza 201.

The index "i" here corresponds to the natural integer identifying the current lane 210, and the index "j" corresponds to the natural integer identifying the lane 210, 220, 230, 240 in question.

This Euclidean distance $d_{ij}$ is obtained taking into account the geo-located position of the motor vehicle 100 and the plan of the toll-collection area 200 read from the memory 142.

In a third step b2), the computer 140 evaluates the congestion of each open lane of the toll-collection area 200.

To do this, the computer 140 computes, for each open lane, a second datum relative to the number of third-party vehicles 300, 310, 320 located in this lane.

This second datum is here an evaluation of the number $n_j$ of third-party vehicles 300, 310, 320 located in this lane.

This evaluation is here obtained by virtue of the measurements carried out by the radar sensor 122 located in the central position at the front of the motor vehicle 100, by the radar sensor 121 located in the position on the left at the front of the motor vehicle 100 and by the radar sensor 123 located in the position on the right at the front of the motor vehicle 100. It is refined via processing of the image acquired by the camera 130 of the motor vehicle 100.

The fourth step c) consists in selecting, among all the lanes that the motor vehicle 100 can easily access, the lane in which the wait to pass the toll plaza 201 will be the shortest.

The criteria that is used to do this is a cost function $J_{ij}$, which is dependent at least on the estimation of the Euclidean distance $d_{ij}$ separating the motor vehicle 100 from each lane, and on the evaluation of the number $n_j$ of vehicles in each lane.

This cost function $J_{ij}$ could be expressed in various ways. It is here expressed in the following way:

$$J_{ij} = d_{ij} \cdot \zeta_{ij} + n_j \cdot \gamma_j$$

where $\zeta_{ij}$ and $\gamma_j$ are two weighting factors.

The values of these weighting factors are chosen so as to favor either the rapidity of passage of the toll plaza (at the risk of the motor vehicle 100 having to change lanes a high number of times) or passenger comfort via selection of a lane that is preferably close to the current lane 210. The values of these weighting factors may either be preset (stored in the read-only memory of the computer) or be parameterizable depending on the preferences of the passengers of the vehicle or on the category of the vehicle (ambulance, vehicle for transporting goods, etc.). These weighting factors may also be expressed in the form of functions, for example in the form of functions of the data $d_{ij}$, $n_j$ to which they relate (affine function, inverse function, square function, etc.).

Irrespectively, the computer uses the same mathematical formula to compute a value of the cost function $J_{ij}$ for each of the lanes of the toll-collection area 200.

The preferred lane 230 is then the lane for which the cost function $J_{ij}$ is minimum. Examples clearly illustrating, in various configurations, which lane is preferred will be detailed later on in this description.

The fifth step d) consists in determining whether it is possible for the motor vehicle 100 to change lane 210, 220, 230, 240 without risk in order to move toward the preferred lane 230.

This step may be carried out in various ways.

Here, the computer 140 computes the maneuver time $t_{EGO}$ that the motor vehicle 100 will require to reach the neighboring lane 220 (into which it desires to pull out) and the location 221 in which this vehicle will end up after this change of lane.

Next, if a preceding vehicle 310 and/or following vehicle 320 are/is present, the computer 140 computes the arrival time $t_{OBJ}$ that these vehicles 310, 320 will require to reach the location 221.

The criterion to determine whether it is possible for the motor vehicle 100 to change lane then simply consists in verifying the following inequality:

$$t_{EGO} < \min(t_{OBJ}) + \delta t$$

where $\delta t$ is a preset safety margin stored in the read-only memory of the computer 140.

If this inequality is not verified (this meaning that changing lane would run a risk) the motor vehicle 100 remains in its lane 210 and the method is restarted with step a).

In the contrary case, the computer 140 implements a step e) consisting in controlling the steering unit of the motor vehicle 100 so that the motor vehicle 100 passes from the current lane 210 to the neighboring lane 220 (the lane that is located on the side of the desired lane 230).

At this stage, firstly it is possible to envision the case where the neighboring lane 220 and the desired lane 230 are one and the same (case in FIG. 3). In this case, the method ends here.

In the contrary case (case in FIG. 4), provision is not made for the motor vehicle 100 to move directly to the desired lane 230 without prior checks by again changing lane.

On the contrary, provision is made to restart the method in its entirety before the motor vehicle 100 once again changes lane. Thus, if the configuration has changed, the motor vehicle 100 may rapidly adapt to this change.

The three examples shown in FIGS. 3 to 6 may now be described in more detail.

In the first example shown in FIG. 3, the motor vehicle 100 is being driven in the current lane 210 identified by the integer i=j=2.

The lane 240 identified by the integer j=4 is closed.

The computer 140 then computes 3 cost functions $J_{21}$, $J_{22}$ and $J_{23}$.

The desired lane 230 will then be the lane for which the cost function is lowest. It will be understood that the result will depend greatly on the weighting factors used.

Thus, if a conservative behavior is preferred, the motor vehicle 100 will choose, given the low number of vehicles in its lane 210, not to change lane.

On the contrary, if a more reactive behavior is preferred, the motor vehicle 100 will choose, given the very low number of vehicles in the neighboring lane 220 on the left, to change lane.

In this case, the motor vehicle will verify beforehand whether it is able to change lane without danger. Here, the preceding vehicle 310 and the following vehicle (not shown) being far from the location 221 that the vehicle desires to move to, the motor vehicle 100 will be able to pull out without danger into the desired lane 230.

In the second example shown in FIG. 4, the motor vehicle 100 is being driven in the current lane 210 identified by the integer i=j=2.

All the lanes of the toll-collection area 200 are here open. Three third-party vehicles 300, 310, 320 are here located in each lane, with the exception of the right-most lane in which there is only a single third-party vehicle 300.

The computer 140 then computes four cost functions $J_{21}$, $J_{22}$, $J_{23}$ and $J_{24}$.

The lane chosen will be the lane for which the cost function is the lowest. The result will thus here depend greatly on the weighting factors used. Thus, the motor vehicle 100 will choose to move to the lane 220 on the right solely if a very reactive behavior is favored.

In this case, the motor vehicle 100 will here again verify whether it is able to change lane without danger. In the present case, the preceding vehicle 310 and the following vehicle 320 being far from the location 221 in the neighboring lane 220 that the vehicle desires to move to, the motor vehicle 100 will be able to pull out without danger into this neighboring lane 220. It will then again possibly compute the cost function for the four lanes before choosing whether to remain in its lane or to actually move to the initially desired lane.

In the third example shown in FIGS. 5 and 6 (two successive times) the motor vehicle 100 is initially being driven in the current lane 210 identified by the integer i=j=4.

This lane, and those identified by the integers j=6 and j=8 are closed. The vehicle must therefore necessarily change lane.

The computer 140 then computes five cost-function values $J_{41}$, $J_{42}$, $J_{43}$, $J_{45}$ and $J_{47}$.

The chosen lane will here again be the lane for which the value of the cost function is lowest. The result of this choice will here again greatly depend on the weighting factors used, but in any case, the motor vehicle 100 will choose to change lane.

As shown in FIG. 5, it will possibly choose to move toward the desired lane 230 located the most to the left.

However, as FIG. 6 shows, after having changed lane a first time, it will possibly observe that it is not possible to change lane again given that the location 221 into which it desires to pull out is already occupied by a preceding third-party vehicle 310. In this case, the computer makes the decision to no longer change lane to pass the toll plaza 210.

Various variants of the embodiment described here are envisionable.

In particular, step d) could be carried out in a different way.

By way of first example, it would be possible, to verify the dangerless character of pulling out, to consider more vehicles. It would thus be possible to compute the time $t_{OBJ}$ not only for the preceding vehicle 310 and following vehicle 320, but also the times $t_{OBJ}$ for any third-party vehicle 300 able to reach the location 221 to which the motor vehicle 100 desires to move (in particular those of third-party vehicles that have turned on their indicators with a view to pulling out into the neighboring lane).

By way of second example, it would be possible as an alternative, to verify the dangerless character of pulling out, not to compare the times $t_{EGO}$, $t_{OBJ}$, but to check criteria relating to the relative speeds of the vehicles with respect to one another.

This check could thus be based on a comparison of the relative speed of the motor vehicle 100 with respect to the preceding vehicle 310 with a first threshold, and on a comparison of the relative speed of the motor vehicle 100 with respect to the following vehicle 320 with a second threshold, in order to verify that these relative speeds are compatible with a change of lane in complete safety.

In the embodiment described with reference to the figures, the vehicle was autonomous. As a variant, provision could be made for this not to be so. In this case, the fifth step e) will no longer consist in automatically steering the motor vehicle 100 toward the desired lane 230, but rather in displaying, on a screen of the vehicle, information allowing the driver to know to which lane he must move to pass the toll plaza as rapidly as possible in complete safety.

The invention claimed is:

1. A method for controlling an autonomous motor vehicle, comprising:
    a) detecting lanes of a toll-collection area;
    b) determining, for at least a portion of said lanes, a first datum relative to a distance separating the motor vehicle from a corresponding lane of said portion of said lanes, and a second datum relative to a number of third-party vehicles located in the corresponding lane;
    c) computing a value of a cost function for each lane of said portion of said lanes, depending on the corresponding first datum and the corresponding second datum, and identifying a preferred lane from the lanes of the toll-collection area as being a lane for which the value of the cost function is a lowest from all of the values of the cost functions that are computed during the computing; and
    d) determining whether a risk for the motor vehicle to change lanes to move to the preferred lane is above a predetermined threshold; and
    controlling the motor vehicle towards the preferred lane, wherein, in c), the value of the cost function is computed for each lane of said portion of said lanes, depending on a sum of the corresponding first datum, weighted by a first coefficient, and of the corresponding second datum, weighted by a second coefficient.

2. The control method as claimed in claim 1, wherein, the motor vehicle being equipped with at least one range-finding sensor, in b), the second datum is an estimation of the number of third-party vehicles located in each lane of said portion of said lanes, which is determined depending on measurements carried out by said at least one range-finding sensor.

3. The control method as claimed in claim 1, wherein d) includes determining whether a maneuver time required for the motor vehicle to change from a lane in which the motor vehicle is traveling to reach a desired location in a neighboring lane is less than an arrival time required by the third-party vehicles being driven in said neighboring lane.

4. The control method as claimed in claim 1, wherein d) includes a two-fold criterion relative to a relative speed of the motor vehicle with respect to two of the third-party vehicles that are being driven in front and behind the motor vehicle, in a neighboring lane to a lane in which the motor vehicle is traveling, is checked.

5. The control method as claimed in claim 1, wherein, the motor vehicle being equipped with an image-acquiring means and a computing unit, in a), the image-acquiring means acquires an image of the toll-collection area and the computing unit processes said image in order to detect lanes of the toll-collection area that are open, and, in b), the computing unit determines the first datum and the second datum for each of the lanes of the toll-collection area that are open.

6. The control method as claimed in claim 1, wherein, the motor vehicle being equipped with an image-acquiring means and a computing unit, in a), the image-acquiring means acquires an image of the toll-collection area, and, in b), the computing unit processes said image in order to evaluate the first datum.

7. The control method as claimed in claim 1, wherein, the motor vehicle being equipped with a geo-locating means, a memory storing a roadmap, and a computing unit, in b), the computing unit computes the first datum depending on a geo-located position of the motor vehicle, the geo-located position being obtained by the geo-locating means, and on a geometry of the toll-collection area, which is stored in the memory.

8. The control method as claimed in claim 1, further comprising, when the preferred lane does not neighbor the lane of the lanes of the toll-collection area being used by the motor vehicle, repeating a) to d) and the controlling after the vehicle has moved one lane towards the preferred lane.

* * * * *